UNITED STATES PATENT OFFICE.

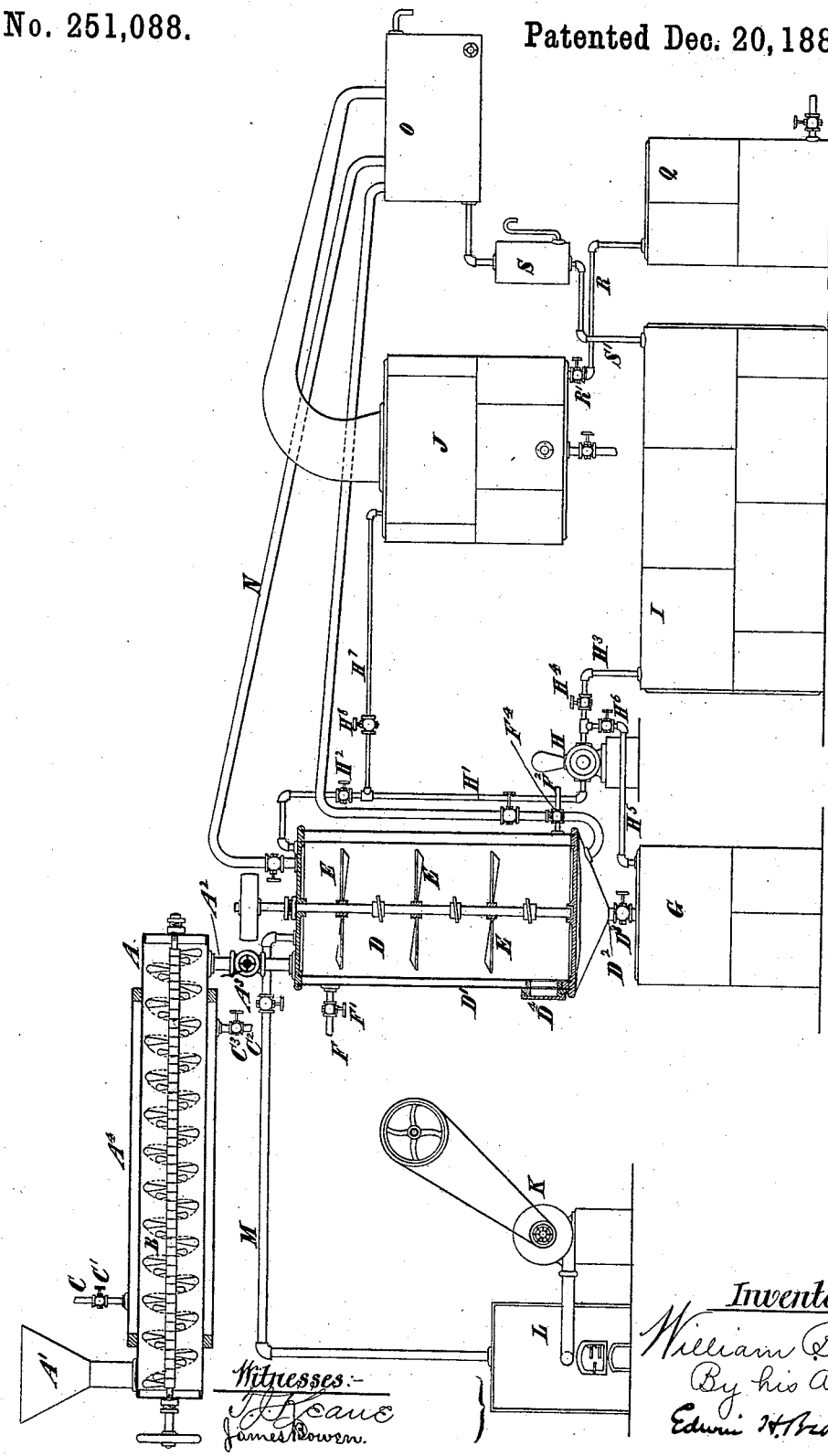

WILLIAM BELL, OF NEW YORK, N. Y.

EXTRACTION OF OIL AND OLEAGINOUS MATTERS FROM VEGETABLE AND ANIMAL MATTERS.

SPECIFICATION forming part of Letters Patent No. 251,083, dated December 20, 1881.

Application filed June 21, 1881. (No model.)

*To all whom it may concern:*

Be it known that I, WILLIAM BELL, of the city of New York, in the county and State of New York, have invented certain Improvements in the Extraction of Oil and Oleaginous Matters from Vegetable and Animal Matters, of which the following is a specification.

My improvements are particularly designed for extracting oil and oleaginous matter from what is known as "hominy chop," consisting of the integument or shell and germ or heart of corn; but the improvements are applicable to the treatment of other vegetable material and of animal material for the same purpose.

The improvements involve a novel process, consisting in first comminuting the material, next heating and agitating it by itself, in subsequently maintaining it heated and agitating it, and meanwhile passing through it naphtha, and then driving off the remaining naphtha by passing heated air directly through the material, as hereinafter fully described. The comminuted material is preferably first heated and agitated in a chamber by itself, and is afterward passed to a second vessel or chamber, wherein it is maintained heated, is agitated, and has naphtha added to it.

The improvements also involve a novel apparatus used in carrying out the aforesaid process.

The accompanying drawing represents a central vertical section of the above-mentioned apparatus.

The hominy chop or other material may be comminuted by any suitable grinding-mechanism or by any other suitable means.

A designates a horizontally-arranged chamber, into which the comminuted material is introduced through a hopper, A', arranged near one end, and from which the said material is delivered through a pipe, $A^2$, arranged near the other end, under control of a cock, $A^3$. Within this chamber is arranged a rotary conveyer, B, which may consist of any suitable worm or screw, but preferably is composed of a number of blades spirally arranged upon a shaft in suitable proximity to each other, as then the material within the said chamber will be constantly stirred up, as well as fed forward. The chamber is heated by steam circulating through a jacket, $A^4$, which surrounds it. Steam is conducted to this jacket from any suitable generator by a pipe, C, provided with a suitable cock, C', and is carried off by a pipe, $C^2$, provided with a cock, $C^3$. The chamber may be heated in any other suitable manner.

D designates an upright cylindric chamber, into which the material is conducted by the pipe $A^2$. In it is arranged a rotary shaft provided with stirring-blades E, which preferably are set obliquely, so that when rotated in the proper direction they will tend to lift the material within the chamber D, and thereby loosen it as well as stir it. This chamber is heated by steam circulating through a jacket, D', surrounding it and supplied thereto by a pipe, F, under control of a cock, F'. The steam and water formed by condensation pass off through a pipe, $F^2$, under control of a cock, $F^4$. Any other suitable means for heating this chamber may be employed. The chamber has at the lower end an outlet, $D^2$, for liquid matter to drain through under control of a cock, $D^3$. G is a tank, into which such liquid matter is delivered, and denominated by me a "drain-tank." The chamber D also has near its bottom an outlet, $D^4$, through which the material from which liquid matter has been extracted may be removed.

H designates a pump, which is connected by a pipe, H', with the chamber D, and by a pipe, $H^3$, with a tank, I, containing naphtha or other liquid having affinity for oleaginous matter. These pipes are respectively provided with cocks $H^2$ and $H^4$. The naphtha may be pumped up from the tank I into the upper portion of the chamber D if the cocks $H^2$ $H^4$ are opened and all other connections of the pump closed. The pump is also connected by a pipe, $H^5$, controlled by a cock, $H^6$, with the drain-tank G, and by a pipe, $H^7$, controlled by a cock, $H^8$, with a still, J. The contents of the drain-tank may therefore be removed from it to the still by the pump H if the cocks $H^6$ $H^8$ are opened and the cocks $H^2$ $H^4$ are closed.

K designates a rotary blower, and L designates a heater, whereby the air escaping from the blower may be heated.

M designates a pipe, whereby air may be conducted to the chamber D when desirable. The heated air may be carried off through a pipe, N, to a condenser, O, consisting of a coil of pipe arranged in a tank of water, the water being kept in circulation, so as to be constantly cool. A pipe, P, leads from the chamber D to the coil of the condenser O, and the still J also communicates therewith.

Q designates the oil-tank, and R designates a pipe controlled by a cock, R', and communicating with the said oil-tank.

S designates a separator, whereby any water which may collect in the condenser with the naphtha may be separated from the naphtha. The latter may flow to the tank I through a pipe, S'. After a sufficient quantity of the comminuted material is delivered from the chamber A into the chamber D, the cock $A^3$ is closed, the cocks $H^2$ $H^4$ are opened, and the cocks $H^6$ $H^8$ are closed, so that the pump will then force a quantity of the naphtha or like liquid from the tank I into the said chamber. The naphtha which is vaporized by coming into contact with the heated material may be allowed to pass off through the pipe P. This will be condensed in the condenser O and returned thence to the tank I. The cock of the pipe P will then be closed and cock $A^6$ will be opened, whereupon the naphtha will drain through the material as it is heated and stirred or agitated, and with the oleaginous matter which is extracted from the material in the chamber D will flow off into the drain-tank G. The cock $A^6$ will then be closed, and the cock of the pipe M will be opened, so that heated air may enter at the top of the chamber D. This heated air will absorb the remaining naphtha and pass off through the pipe N to the condenser O. Hence the naphtha will be reclaimed. Afterward the material may be removed from the chamber A through the outlet $A^7$. Next the cocks $H^2$ $H^4$ are closed and the cocks $H^6$ $H^8$ opened, whereupon the contents of the drain-tank G will be pumped into the still J. The oil is purified in the still and passes thence into the oil-tank Q; but the naphtha from the still passes off to the condenser, thence to the separator, and finally to the tank I again. In this way I greatly enhance the quality and value of the material treated, and I procure therefrom oil or oleaginous matter which is of considerable value.

What I claim as my invention, and desire to secure by Letters Patent, is—

1. The process of extracting oil and oleaginous matter from hominy chop or other vegetable material, or from animal material, consisting in first comminuting the material, next heating and agitating it by itself, in subsequently maintaining it heated and agitating it, and meanwhile passing through it naphtha, and then driving off the remaining naphtha by passing heated air directly through the material, substantially as specified.

2. The process of extracting oil and oleaginous matter from hominy chop and other vegetable material, or from animal material, consisting in first comminuting the material, next heating and agitating it in a chamber by itself, then passing it to another chamber where its heat is maintained, and there agitating it and adding to it naphtha, and then driving off the remaining naphtha by passing heated air directly through the material, substantially as specified.

3. The combination of the chamber A, wherein the commminuted material is first placed, means for agitating the material in said chamber, a steam-jacket whereby the material is heated, the chamber D, a pipe for delivering heated material from the chamber A to the chamber D, means for agitating the material in the chamber D, a steam-jacket surrounding the chamber D, for maintaining the material therein in a heated condition, a pipe for introducing naphtha into the chamber D, and the blower K, furnace L, and pipe M, for supplying heated air to the chamber D, all substantially as specified.

WM. BELL.

Witnesses:
T. J. KEANE,
FREDK HAYNES.